United States Patent [19]
Brophy

[11] 3,731,725
[45] May 8, 1973

[54] SELF STOPPING AND LOCKING SCREW

[76] Inventor: Alfred H. Brophy, 564 S. Monterey Pass Road, Monterey Park, Calif. 93940

[22] Filed: July 6, 1971

[21] Appl. No.: 159,785

[52] U.S. Cl. ................................................151/22
[51] Int. Cl. .............................................F16b 39/30
[58] Field of Search ..................151/22, 21 B, 140 W, 151/14.5, 7; 85/46, 47, 48

[56] References Cited

UNITED STATES PATENTS

| | | | |
|---|---|---|---|
| 2,174,578 | 10/1939 | Graham | 85/46 |
| 2,371,365 | 3/1945 | Tomalis et al. | 151/22 |
| 2,382,019 | 8/1945 | Miller | 85/46 |
| 3,428,377 | 2/1969 | Christian et al. | 151/22 |
| 3,489,195 | 1/1970 | Mortus | 151/22 |

FOREIGN PATENTS OR APPLICATIONS

| | | | |
|---|---|---|---|
| 413,027 | 7/1934 | Great Britain | 85/46 |
| 1,099,620 | 3/1955 | France | 151/22 |

*Primary Examiner*—Marion Parsons, Jr.
*Attorney*—Georges A. Maxwell

[57] ABSTRACT

A self locking screw fastener comprising an elongate shank with front and rear ends and a tool engaging head, at the rear end of the shank, said shank having axially spaced front and rear threads roll formed thereon and a straight, cylindrical forming portion intermediate the threads, the front thread having a tapered female thread forming rear end portion diminishing circumferentially and rearwardly in the forward part of the forming portion and the rear thread having a tapered female thread forming front end portion diminishing circumferentially and forwardly in the rear part of the forming portion.

1 Claim, 6 Drawing Figures

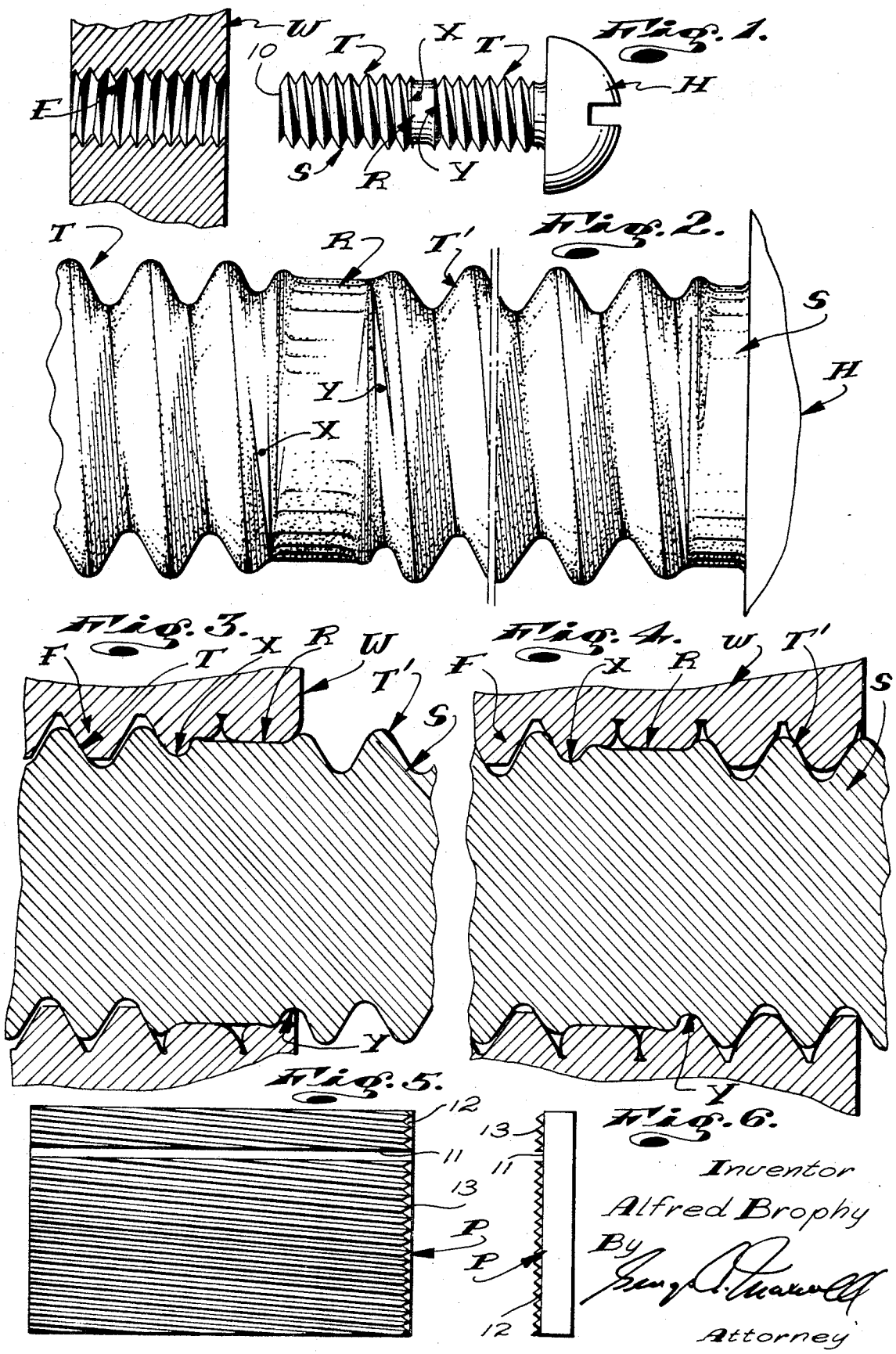

SELF STOPPING AND LOCKING SCREW

This invention has to do with a self-locking screw fastener and is more particularly concerned with that class of self-locking screw fastener having roll formed threads which are altered or modified to establish predetermined interference with complimentary female threads in related work pieces whereby the fasteners are frictionally held of locked against undesired retrograde rotation relative to and displacement from the work piece.

The prior art, relating to the above noted class of self-locking fasteners, is old and highly developed.

The self locking fastener structures provided by the prior art, as a general rule, involve deforming portions of established threads on a screw fastener in a predetermined manner, so the deformed portion of the thread establishes interferring, binding and frictional engagement in a complimentary female thread as the worked upon portion of the fastener thread is advanced into engagement with said female thread.

In some self-locking screws of the class here concerned with, the lead angle of the worked upon portion of the screw thread is moved out of parallelism with adjacent turns of the thread. In other fasteners, the worked upon portion of the threads are flattened so as to increase the axial extent or thickness thereof to a predetermined extent greater than the axial spacing of the opposing flanks of a related female thread. In still other structures of the class of fastener here concerned with, the thread is, in effect, dimpled or otherwise upset at predetermined points to establish protuberances which frictionally engage a complimentary female thread. In yet other fasteners of the class here concerned with, a desired extent of the screw thread is only partially formed so that it will not be freely accepted or be received by a complimentary female thread, but will establish tight frictional engagement therewith. Finally, in certain of such fasteners provided by the prior art, after the thread has been established, the thread is upset and broken by the formation of an annular groove in the fastener at a predetermined point longitudinally of the thread.

In each of the above types of structures provided by the prior art, a normal thread is established and a portion thereof is subsequently worked upon to upset and/or interrupt its symmetry. In many of these structures, the worked upon or upset portion of the thread is such that, when used, it mutilates or destroys the female thread and/or adjacent portions of the fastener thread to such an extent that the fasteners and/or the female thread are rendered incapable of re-cycling. In other of the above noted structures, the upset portions of the threads, when used, are reformed by the female threads and are such that the holding or locking effect afforded thereby is only attained on the first cycling of the fasteners and is not subsequently attainable.

In many of those self-locking fasteners provided by the prior art and particularly in those where annular grooves are established in the screw shanks to interrupt the threads and deform the portions of the threads adjacent the grooves; the shanks of the screws are materially weakened by reducing the diameter thereof and/or by drawing and moving the metal excessively and to an extent that the metal is adversely upset and/or work hardened, rendering them undependable and weak.

In certain of the self-locking fasteners provided by the prior art and as briefly described above, the interferring fit established between the male and female threads is such that undesirable tensile forces are established in the fasteners which render the fasteners subject to failure.

In the normal course of establishing a rolled thread in a fastener, a fastener blank, including a straight cylindrical shank with a head pre-formed thereon, is engaged between a pair of die plates with opposing faces having straight longitudinally inclined threads extending longitudinally thereof. The plates are urged into pressure engagement with the blank shank and are reciprocated longitudinally relative to each other to roll the shank therebetween and to form the desired thread thereon. The diameter of the blank shank is greater than the root diameter and is less in outside diameter than the finished thread. In practice, the diameter of the shank blank is equal to the mean diameter of the thread.

In establishing threads in the shanks of fasteners in the above manner, the threads, at the inner, free ends of the shanks run to the end of the shanks uninterrupted or in unaltered form. The other or rear ends of such threads, which terminate at a point spaced longitudinally of the shanks terminate in diminishing tapered end portions, that is, they become progressively shallower throughout their last one or one-half turn and until they fade out entirely. In those cases where a thread is rolled into a shank or like piece of work intermediate the ends thereof and where its inner or lead end does not run off the shank or piece of work, the lead end of the thread, like the other or rear end thereof, has a tapered lead end portion commencing at the surface of the blank and becoming progressively deeper, for about one or one half turns of the thread until it reaches the full thread depth.

The pitch angle of tapered trailing and leading end portions of rolled thread is the same as the pitch angle of the finished or completed threads.

The ordinary female thread established to accomodate a threaded fastener shank such as referred to above is established in the part in which it occurs by establishing a pilot opening or hole which is slightly less in diameter than the means diameter of the male thread of the fastener. The opening is then tapped to establish the desired complimentary female thread.

As a general rule, with reference to the depth of the resulting female threads, the pilot openings are of a size or diameter so that only the outer 65 to 70 percent of a full or complete thread is established; that is, so that the resulting thread is like a full thread of maximum depth with about 30 to 35 percent of its root portion removed.

With the above noted proportion of a complimentary male and female thread, and allowing for normally provided working tolerances and with reference still being made to the depth of the finished thread, about 10% to 15% of the innermost root portions of the female thread occur radially inward of the mean diameter of the complimentary male thread and/or the diameter of a blank protion of the fastener shank.

As a result of the above, in order to enter a blank portion of a fastener shank into an opening formed with threads which are complimentary with threads on the shank, the blank portion of the shank would have to displace 10 to 15 percent of the innermost or root portions of the female threads.

An object of this invention is to provide a self-locking screw fastener having two axially spaced helically aligned threads and an intermediate forming section to engage and displace or deform the lead portion of a complimentary female thread whereby frictional locking engagement is established between the deformed portion of the female thread and the forming section.

Another object of my invention is to provide a fastener of the character referred to above wherein the lead end of the deformed portion of the female thread establishes a stop against which the tapered lead end portion of the second to engage or trailing thread on the fastener stops to limit engagement of the fasteners into the work piece in which the female thread is established.

Yet another object and feature of the present invention is to provide a self-locking fastener of the character referred to wherein the tapered lead end portion of the second to engage or trailing thread on the fastener will, upon application of sufficient increased torque on the fastener, reform the displaced and deformed portion of the female thread, behind the forming section, and so that increased frictional locking engagement between the fastener and the work piece is established.

An object and feature of the present invention is to provide a fastener of the character referred to wherein the forming section is established by a non-worked upon section of the shank of the fastener blank in which the two axially spaced threads are roll formed whereby the forming section is less in outside diameter than the outside diameter than the thread, is greater in outside diameter than the root diameter of the threads and is greater in outside diameter than the root diameter of complimentary female threads to an extent that from about 10 to 15 percent of the root portions of complimentary female threads are of less diameter than the forming section.

Yet another object and feature of this invention is to provide a structure of the character referred to above wherein the forming section is not worked upon and weakened, or otherwise adversely effected during the manufacture of the fastener and is as strong as the strongest portion of the shank of the fastener.

It is an object and feature of my invention to provide a screw fastener of the character referred to which is such that the forming section thereof progressively displaces and deforms a female thread radially outwardly as it is advanced in or by the female thread and in such a manner that the female thread is not mutilated or destroyed and can be satisfactorily reformed to its original state or condition without adverse effect thereto.

With the fastener structure that I provide, the female thread, when acted upon by the forming section of the fastener, is not extensively reformed at its outer base portion, but rather, has its innermost flexible and un-supported root portion burnished circumferentially and displaced radially outwardly to a limited predetermined extent and in such a manner that the metal establishing the female thread is not cut, torn, pulled or otherwise worked upon to an end that it is materially weakened or to an extent that the thread is permanently mutilated or destroyed.

In establishing the self-locking fastener provided by the prior art, the locking portions of the threads are, as a general rule, established by separate forming operation performed on the fasteners subsequent to establishing the standard threads thereon. In those exceptional cases where the locking or interferring portions of the threads of such fasteners are established at the same time that the threads are established or rolled into the fastener blanks, complicated and costly to make thread rolling dies must be provided and utilized.

With the structure that I provide, the forming section of the fastener, being an un-worked upon section of the fastener blank, is left in the shank of the fastener, between the two threads established thereon; it is not formed thereon by separate and special work performed upon the fastener.

Accordingly, the two axially spaced threads can be and are formed and rolled into the fasteners by a set of conventional thread rolling dies having simple, straight, longitudinally extending, parallel opposing channels thereon and so located as not to engage or work on the fastener blanks where the forming sections are to be left to occur.

Finally, it is an object and feature of my invention to provide a fastener structure of the character referred to which is easy and economical to manufacture and which is highly effective and dependable in use.

The foregoing and other objects and features of the present invention will be fully understood and will become apparent from the following detailed description of a typical preferred form and embodiment of the invention, throughout which description reference is made to the accompanying drawing, in which:

FIG. 1 is a side elevational view of a screw fastener embodying the present invention and showing it arranged for entry into a related work piece;

FIG. 2 is an enlarged view of a portion of the fastener shown in FIG. 1;

FIG. 3 is a sectional view of a portion of my fastener and showing it engaged in and with complimentary female threads in the work piece.

FIG. 4 is a view similar to FIG. 3 and showing the parts in another position;

FIG. 5 is a plane view of a die plate provided by the present invention; and,

FIG. 6 is an end view of the die block shown in FIG. 5.

For the purpose of illustration, I have shown the present invention in a form similar to a standard round head machine screw F with S.A.E. front and rear standard threads T and T'.

The screw includes an elongate cylindrical shank S with a front end 10 and an enlarged, semispherical, slotted head H at its other or rear end. The threads T and T' extend longitudinally of the helically about the shank S and are spaced apart longitudinally of each other whereby the rear end of the thread T is spaced longitudinally forward of the front end of the thread T'. The threads T and T' therefore are properly defined as front and rear threads and will, where appropriate, be referred to as such in the following.

The blank portion of the shank S between the front and rear threads T and T' is a simple straight, cylindrical portion and establishes or defines a forming section H in the shank.

In the establishment or manufacture of screw fasteners with rolled threads, screw blanks having straight cylindrical shanks and heads of desired configuration suitably formed thereon, are initially established. The threads are then roll formed in the blank shanks by engaging them between a pair of similar, mating, relatively reciprocating plate or block-like die plates. The die plates have flat, opposing working faces with straight parallel threads formed therein, which threads are inclined relative to the longitudinal axis of relative travel of the die plates.

In carrying out the present invention, the front and rear threads T and T' can be and are preferably established by a pair of substantially conventional die plates modified by the simple establishment of opposing parallel grooves in their opposing work faces. The grooves are paralleled with the longitudinal axis of relative travel of the die plates and are angularly related to and intersect certain of the inclined threads on said plates. The grooves are of sufficient depth to remove the threads on the plate, can be of any desired lateral extent and can be located in any desired position, laterally of the longitudinal axis of the plates whereby the axial extent and axial placement of the forming sections can be varied and controlled, as desired and as circumstances require.

In FIGS. 5 and 6 of the drawings, I have illustrated one of a pair of die plates modified in accordance with this invention. The die plate P is shown as having a groove 11 established in its work face 12 and intersecting and removing the whole or portions of the inclined threads 13 thereon.

With the die plate structure shown, it will be apparent that when the shank of a screw blank is engaged between a related pair of such plates with its axis normal to the axis of the grooves in the plates and the plates are shifted relative to each other, longitudinally relative to the axis of the grooves, and so as to roll the shank therebetween (under desired pressure), a pair of separate and distinct threads, in helical alignment with each other and spaced apart by an intermediate blank portion are established in the blank. In the instant case, such dies serve to establish the front and rear threads T and T' and the forming section H of my new fastener.

The rear end portion X of the front thread T that is the last or rearmost turn, or a portion thereof, diminishes or tapers down, that is, it becomes progressively smaller, being less in crest or outside diameter and greater in root diameter as it progresses rearwardly, until it ends and fares into the outer surface of the forming section at the front end thereof. The pitch of the tapered down or diminishing rear portion S of the thread T remains unchanged and is the same as the remainder of the thread.

The front end portion Y of the rear thread T', that is, the foremost turn, or a portion thereof, develops or tapers open, that is, it starts at a point in the rear outside surface of the forming section H and becomes progressively larger in crest and smaller in root diameter until it reaches the full crest and root diameter of the thread T'. The pitch of the forward tapered developing portion Y of the Thread T' remains unchanged and is the same as the reminder of the thread.

The rear diminishing, end portion X of the thread T, when advanced into engagement with a female thread F, in a related work piece W and in which the thread T is cooperatively engaged, acts in the nature of a wedging surface or inclined plane and advances parallel with the female thread, bearing on the crest thereof and displacing said female thread radially outwardly. The displaced mass of the female thread, as shown at F' in the drawings, is accommodated in the space between its adjacent turns, adjacent the thread portion X, which space is normally occupied by a portion of a full or complete male thread.

When the rear terminal end of the portion X of the thread T is engaged with the female thread F, the female thread is displaced to the full extent afforded by the fastener and is in tight, pressure, frictional engagement with the outer surface of the forming section H as shown in the drawings.

By varying the longitudinal or axial extent of the forming section H the linial extent of the female thread which is displaced or deformed and the extent or area of frictional contact between the forming section H and the deformed female thread can be adjusted to vary and control the frictional holding or locking effect between the fastener and the work piece.

When the forming section H is fully engaged in the female thread F, as shown in FIG. 3 of the drawing and the developing front end portion Y of the rear thread T' is advanced into engagement with the outermost end of the displaced and deformed portion F' of the female thread, the related portions of the male and female thread are in proper pitch and helical alignment, but the narrow and shallow leading end of the developing portion Y of the male thread T' can not accommodate the deformed and broadened rear end of the portion F' of the female thread and advancing of the fastener into the work piece W is stopped.

The above noted stopping action is a special function and is distinct from the previously mentioned frictional locking action. The stopping action now under consideration serves the same or similar purpose or end that is attained by a shoulder bolt, that is, a bolt or screw fastener having an enlarged shank portion rearward of its threaded portions, which enlarged portion defines a stop shoulder to engage a related work piece and limit engagement of the bolt or fastener into the work piece. Such shouldered fasteners are commonly employed to secure fragile or compressible elements to related parts and where it is desired to limit the extent to which the head of the fastener can be advanced toward such a related part and/or into said element.

It will be apparent that by suitably arranging or locating the forming section H in the shank of my fastener, the extent to which the fastener can be engaged in a work piece, before it reaches the noted stopped position can be easily and accurately controlled.

After the fastener has reaches its stopped position, as shown in FIG. 3 of the drawings, it can, by the application of increased torque, be urged into further and greater or deeper engagement in the work piece, as is shown in FIG. 4 of the drawings.

When increased torque is applied to the fastener, as above indicated, the developing lead portion Y of the thread T', being tapered and being in helical pitch alignment with the deformed portion of the female thread, wedgingly acts upon and reforms the female thread to a substantially normal condition where it is cooperatively received and engaged by the remainder of the thread T'.

When the fastener that I provide is advanced into the female thread in a related work piece to an extent that the rear thread T' establishes full mating engagement with the female thread, as set forth above, an axial portion of the female thread equal to the axial extent of the portion X, H and Y of my fastener is progressively deformed and reformed.

Upon retrograde rotation of the fastener, the diminishing rear end portion X of the thread T, being like the developing front portion Y of the thread T and the developing portion of the front portion Y of the thread T' become the diminishing portion of that thread. As a result of this noted reversal, it will be apparent that the fastener acts upon the female thread of a related work piece in the same manner in retrograde rotation as it does in normal advancing rotation, that the fastener can be readily removed and that when it is removed, the female thread is left in a substantially normal condition, preparatory to receipt of the same or another fastener.

It is highly important and significant to note that with the fastener construction that I provide the central, intermediate forming section is established by a full diameter un-worked upon portion of the shank portion of the fastener blank and is stronger than the worked upon, threaded portions of the fastener shank.

Further, it is important and significant to note that the portions X and Y of the threads T and T' being such that they taper into and from the portion H do not establish sharp or acutely formed parts or portions in the fastener shank, adjacent the portion H which would create weakened fracture or shear lines in and through the fastener shank and require a minimum working of the shank stock during manufacture of the fastener.

Still further, it is to be noted that the portions X and Y of the threads T and T' being tapered as set forth above, and being in pitch and helical alignment with the remainder of the related threads and with a complimentary female thread in which the fastener is engaged are in fact and can be properly defined as thread forming die members at the opposite ends of the forming section H and formed integrally with the ends of their adjacent related threads.

Having described only typical preferred forms and applications of my invention, I do not wish to be limited or restricted to the specific details herein set forth, but wish to reserve to myself any modifications and/or variations that may appear to those skilled in the art to which this invention pertains.

Having described my invention, I claim:

1. A self-locking screw fastener comprising an elongate shank with front and rear ends and tool engaging means at the rear end of the shank, said shank having longitudinally extending front, intermediate and rear portions, an elongate front thread in and about the front portion and having a female thread re-forming portion at its rear end and extending into the front part of the intermediate portion, an elongate rear thread in and about the rear portion and having a female thread re-forming portion at its front end and continuing forwardly into the rear part of the intermediate portion, said intermediate portion being straight and cylindrical intermediate its ends and being greater in diameter than the root diameter of the front and rear threads, less in outside diameter than the outside diameter of the front and rear threads and greater in outside diameter than the root diameter of a female thread which is complimentary with said front and rear threads, said complimentary threads being softer than the shank whereby they are deformed by the re-forming portions of the front and rear threads when engaged thereby, said thread re-forming portions at the rear and front ends of the front and rear threads and in the front and rear parts of the intermediate portion of the shank are axially tapering and diminishing extensions of said threads terminating in the intermediate portion at the surface thereof, the helical axes of the longitudinally spaced front and rear threads and of the female thread re-forming portions being coincidental, the re-formed female thread portions between the front and rear threads establishing circumferential and axial sliding frictional engagement with the central portion.

* * * * *